US012786541B2

(12) United States Patent
Drasbæk

(10) Patent No.: US 12,786,541 B2
(45) Date of Patent: Nov. 3, 2026

(54) ENDOSCOPE WITH DIFFRACTIVE LIGHT SHAPING STRUCTURE

(71) Applicant: AMBU A/S, Ballerup (DK)

(72) Inventor: Jacob Bøgh Drasbæk, Brønshøj (DK)

(73) Assignee: AMBU A/S, Ballerup (DK)

( * ) Notice: Subject to any disclaimer, the term of this patent is extended or adjusted under 35 U.S.C. 154(b) by 0 days.

(21) Appl. No.: 19/220,865

(22) Filed: May 28, 2025

(65) Prior Publication Data

US 2026/0012693 A1 Jan. 8, 2026

(30) Foreign Application Priority Data

Jul. 5, 2024 (DE) ..................... 10 2024 119 164.3

(51) Int. Cl.

*H04N 23/50* (2023.01)
*H04N 23/51* (2023.01)
*H04N 23/55* (2023.01)
*H04N 23/56* (2023.01)

(52) U.S. Cl.

CPC ........... *H04N 23/555* (2023.01); *H04N 23/51* (2023.01); *H04N 23/55* (2023.01); *H04N 23/56* (2023.01)

(58) Field of Classification Search

None

See application file for complete search history.

(56) References Cited

U.S. PATENT DOCUMENTS 8,812,087 B2 8/2014 Yelin et al.
9,125,582 B2 9/2015 Petersen
11,291,352 B2 4/2022 Vilhelmsen et al.
11,766,163 B2 9/2023 Sørensen et al.
12,092,809 B2 9/2024 Morimoto
2010/0010314 A1 1/2010 Krattiger et al.
2010/0160792 A1 6/2010 Furnish et al.
2011/0319717 A1 12/2011 Pascal
2012/0051693 A1* 3/2012 Yoshida ............. G02B 23/2469 359/599
2013/0030251 A1 1/2013 Lei
2014/0107416 A1* 4/2014 Birnkrant ........... A61B 1/00124 600/110
2018/0183981 A1* 6/2018 Talbert ..................... A61B 1/07
2021/0063618 A1 3/2021 Tearney et al.
2022/0171178 A1* 6/2022 Morimoto .......... A61B 1/00096

(Continued)

FOREIGN PATENT DOCUMENTS

DE 102006053487 A1 5/2008
EP 3737285 B1 8/2023

OTHER PUBLICATIONS

"Next-Generation Optics for the Display and Lighting Industries," Luminit, Retrieved from the link: "https://luminitco.com/wp-content/uploads/2015/11/Next-Generation-Optics-1_0.pdf", Nov. 2015, pp. 1-32.

(Continued)

*Primary Examiner* — Shadan E Haghani

(74) *Attorney, Agent, or Firm* — Faegre Drinker Biddle & Reath LLP

(57) ABSTRACT

An endoscope including an insertion cord which has a bending section and a distal tip having a camera window and a camera. The distal tip has a light emitter where light emitted from the light emitter passes a diffractive structure shaping the light from the light emitter. The light emitter may be a distal end of a light guide connected to a light source.

19 Claims, 7 Drawing Sheets

(56) References Cited

U.S. PATENT DOCUMENTS

| | | | | |
|---|---|---|---|---|
| 2025/0130416 | A1* | 4/2025 | Harada | G02B 23/243 |
| 2025/0389944 | A1* | 12/2025 | Harada | G02B 23/2461 |

OTHER PUBLICATIONS

Lu et al., "Fabrication of light-shaping diffusion screens", Optics Communications, vol. 214, No. 1-6, 2002, pp. 55-63.

Murphy et al., "Holographic beam-shaping diffractive diffusers fabricated by using controlled laser speckle", Optics Express, vol. 26, No. 7, 2018, pp. 8916-8922.

Search report for German Patent Application No. 102024119164.3 dated Apr. 4, 2025, 12 pages (6 pages English Translation and 6 pages Original Copy).

* cited by examiner

ENDOSCOPE WITH DIFFRACTIVE LIGHT SHAPING STRUCTURE

CROSS-REFERENCE TO RELATED APPLICATIONS

This application claims priority from and the benefit of German Patent Application No. 10 2024 119 164.3, filed Jul. 5, 2024 (1275/DE); the disclosure of said application is incorporated by reference herein in its entirety.

TECHNICAL FIELD

The present technology relates to a medical electrode for measuring a biopotential, an electrode array comprising the medical electrode, and a method for manufacturing the electrode and electrode array.

BACKGROUND

In endoscopy for medical purposes endoscopes are used for visual navigation into, and examination and diagnosis of, hollow organs and body cavities. For such purposes the quality of the image provided to the endoscope's user is an important parameter. The level of this quality is primarily influenced by the camera applied and by the light provided to the target to be observed. Both the amount of light and the distribution of light in the image field of view is important for image quality.

For single-use endoscopes, i.e., designed to be used for only one patient and then discarded, the light source, e.g., in the form of one or more LEDs, may often be placed in the distal tip of the endoscope. However, for endoscopes where a powerful light source, or light sources providing different specific colors, are needed, it may be preferred to place the light source either in the endoscope's handle or in a separate box, such as a control unit for the endoscope. Thereby, heat generation by a light source in the distal tip can be avoided, and re-use of light sources may be an option. For that purpose, a light guide, e.g., in the form of a light fiber, going from at least the handle of the endoscope to the distal tip may be needed for guiding the light to the field of view of the camera.

When light guided through a light guide exits the distal end (e.g., of a light fiber) it is scattered at an angle which is often smaller than needed to illuminate the full field of view of the endoscope camera. When the light guide is a light fiber, the scattering angle could be approximately 30 degrees in relation to a center axis of the fiber. This depends on the numerical aperture of the light fiber. Often a higher scattering angle of the illumination light may be necessary. Traditional optical lenses may be applied to achieve this. However, optical lenses take up space, and especially in the smaller endoscopes, the distal tip only has very limited space. Also, the use of optical lenses may complicate the assembly of the endoscope.

SUMMARY

An object of the present technology is to provide scattering of the illumination light from an endoscope which is matched to or larger than the field of view of the camera. Preferably, this is done with a design which is simple to manufacture, takes up as little space as possible, and looses a minimum of light intensity.

In a first aspect, the present technology provides an endoscope comprising a distal tip having a light emitter, a diffractive structure distal of the light emitter, and a camera, the distal tip being configured such that the light emitted from the light emitter passes through the diffractive structure, which shapes the light from the light emitter. The light emitter may be a distal end of a light guide connected to a light source. The light emitter may also be a light emitting diode (LED) positioned at the distal end of the endoscope. The LED may also be a light source adjacent proximally of the light guide. The LED may be positioned in a handle or a tip housing of the endoscope. The diffractive structure may be molded as part of the process of molding the housing for the distal tip. This means that the molding tool may be provided with a surface structure forming the diffractive structure on the proximal side of a light emitter window. The diffractive structure may also be imprinted into the proximal side of the light emitter window after the molding process, e.g., by punching/engraving.

In one embodiment according to the first aspect, the endoscope comprises an insertion cord which comprises an insertion tube, a bending section, and the distal tip. The distal tip includes a tip housing with a distal wall comprising a light emitter window. The tip housing is arranged at a distal end of the bending section, which is arranged at a distal end of the insertion tube. The camera is positioned in the tip housing.

A gap may be provided longitudinally between the light emitter and the diffractive structure. The gap may beneficially allow the light beam emitted from the light emitter to widen before reaching the diffractive structure, thereby enhancing the widening effect of the diffractive structure. The term "gap" in this context is used to indicate that the space between the light emitter and the diffractive structure is devoid of structure. While air is convenient, the space could be filled with air or a gas, such as nitrogen, nitrous oxide, helium, etc. The gap may be referred to as an "air gap" to convey this concept but the air gap could be filled with a gas or a combination of gases that are different from just air.

Provision of the diffractive structure as described above can provide a homogeneous and well-defined light beam giving an optimal illumination of the field of view. This is achieved with a minimum loss of light intensity when comparing with application of a traditional light diffuser. Preferably, the resulting light beam will be as wide, or wider, as the field of view of the camera at a predetermined distance from the distal surface of the light emitter window. Such beneficial outcome is achieved with a design having very limited space requirements, as both the light fiber and the diffractive structure take up a minimum amount of space in the distal tip. As the size of the endoscope is continuously reduced, for example with a tip housing having a diameter of 3.2 mm or smaller, reducing space requirements allows for reductions in the diameter of the tip part and of the insertion cord overall.

The light emitter may be a light guide extending from the handle to the tip housing. The light guide has a light entry end and a light exit end and is connected to a light source at the light entry end. The light exit end is configured to emit light toward the light emitter window. The diffractive structure is positioned between the light exit end and a distal surface of the light emitter window. The light guide passes through the insertion cord with the light exit end fixedly connected in the tip housing. As used herein, "light guide" means a longitudinal structure with a proximal end, or light entry end, configured to receive light and a distal end, or light exit end, configured to emit light. The light guide may comprise a fiberoptic fiber or a bundle of fiberoptic fibers.

The light source may be positioned in the handle and may comprise one or more LEDs located in the handle.

The light source may be positioned outside the handle. The light guide may extend from the light source through the handle to the distal tip and may be configured as a single piece light guide or as portions connected together. The light source may comprise an independent apparatus or may be positioned in monitor or video processor connectable to the endoscope.

The light emitter may also be a light guide in the tip housing. The light guide may extend from a light source positioned entirely in the tip housing. The light source may be a LED.

The light emitter may also be a LED positioned entirely in the tip housing and comprising a light exit end configured to emit light toward the light emitter window through, in order, the air gap, the diffractive structure, and the distal surface of the light emitter window.

In a second aspect the present technology relates to a system comprising an endoscope according to the first aspect and variations thereof, a monitor and a control unit.

In a third aspect the present technology relates to a method for manufacturing the endoscope according to the first aspect. The method comprises providing the insertion cord, the tip housing, and the light guide, providing a layer with the diffractive structure in a transparent material, inserting the light guide through the insertion cord, connecting the light exit end fixedly in the tip housing, and arranging the layer with a diffractive structure between the light exit end and the outer surface of the light emitter window.

Further features and combinations consistent with the present technology will become apparent from the dependent claims and from the following detailed description. Features described in the present technology may be combined so as to form further arrangements within the scope of the present technology that are not expressly set out herein.

BRIEF DESCRIPTION OF THE FIGURES

The above-mentioned embodiments, features and advantages thereof will be further elucidated by the following illustrative and nonlimiting detailed description of embodiments disclosed herein with reference to the appended drawings, wherein.

In the drawings, corresponding reference characters indicate corresponding parts, functions, and features throughout the several views. The drawings are not necessarily to scale, and certain features may be exaggerated in order to better illustrate and explain the disclosed embodiments.

DETAILED DESCRIPTION

In the following description, for purposes of explanation, specific details are set forth in order to provide an understanding of the invention. It will be apparent, however, to one skilled in the art that the invention can be practiced without all these details. Furthermore, one skilled in the art will recognize that embodiments of the present invention, described below, may be implemented in a variety of ways. For simplicity, the present technology is described with reference to a two-way bending endoscope with a distal camera window. However, the present technology is suitable for four-way bending endoscopes and endoscopes comprising lateral camera windows.

Figure 1:
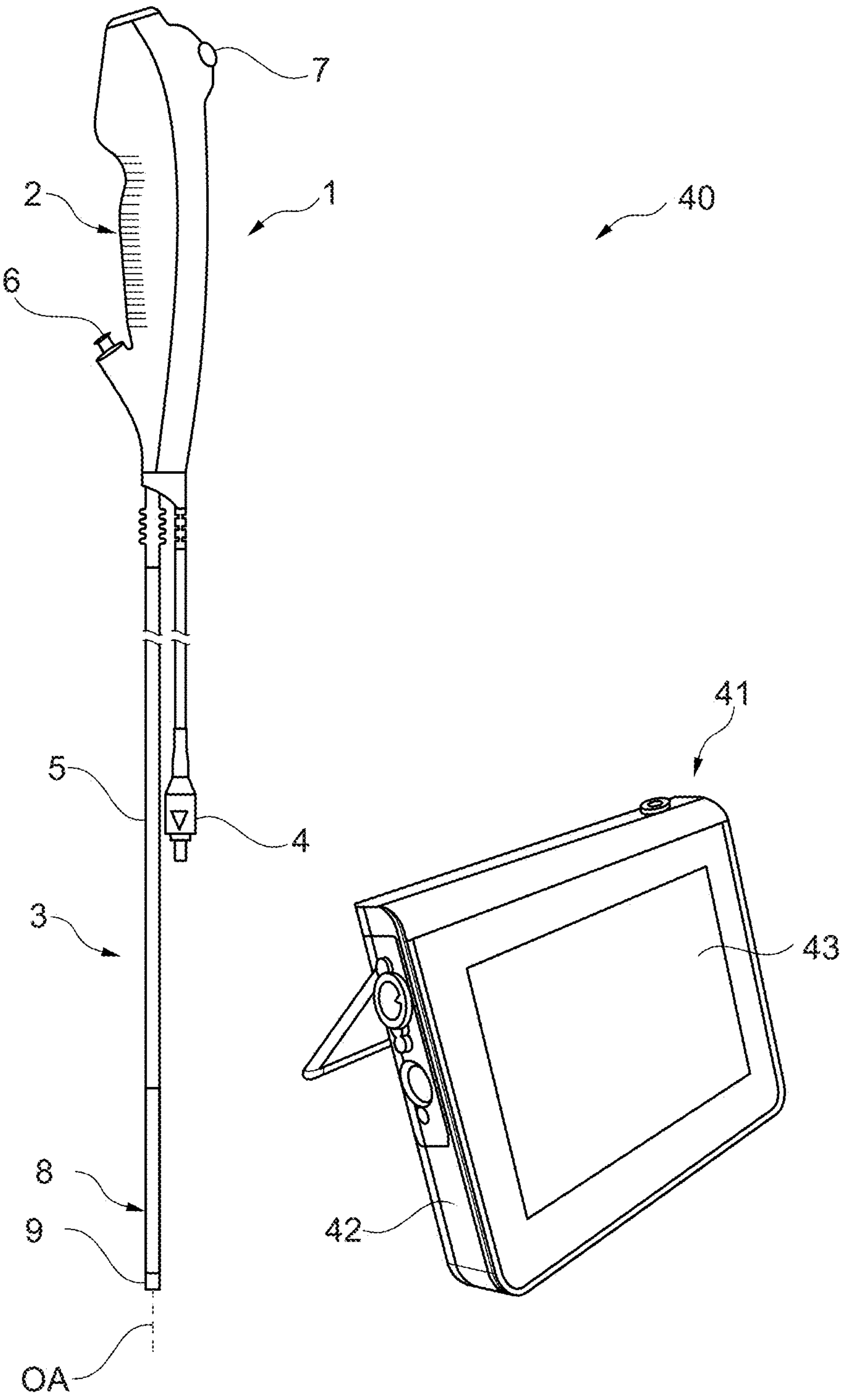
FIG. 1 shows a visualization system comprising an endoscope and a monitor with a control unit.

FIG. 1 illustrates a visualization system 40 comprising an endoscope 1 and a monitor 41. The endoscope comprises a handle 2, an insertion cord 3 and an electrical cable with a connector 4 to connect the endoscope 1 to the monitor 41. The insertion cord 3 is the part to be inserted into a patient during an endoscopic procedure. The insertion cord 3 comprises an insertion tube 5, a bending section 8, and a distal tip 9. The handle 2 may comprise an entrance to a working channel 6 running through the insertion cord 3 to an opening at the distal tip 9. The distal tip further comprises a camera (see FIGS. 2-4) with an optical axis OA. The handle also comprises a bending lever 7, which can be used for bending the bending section 8.

The monitor 41 comprises a control unit 42 and a screen 43. The control unit 42 comprises an electronic circuit for receiving and processing the image stream from the camera 10 (see FIG. 4) as well as a processor for image processing, user interface, storage of images etc. The screen 43 displays the image stream from the camera 10. The monitor 41 may be one unit or housing comprising both the control unit 42 and the screen 43. The control unit 42 and the screen 43 may also be separate parts, e.g., two separate units or housings (not shown).

Figure 2:
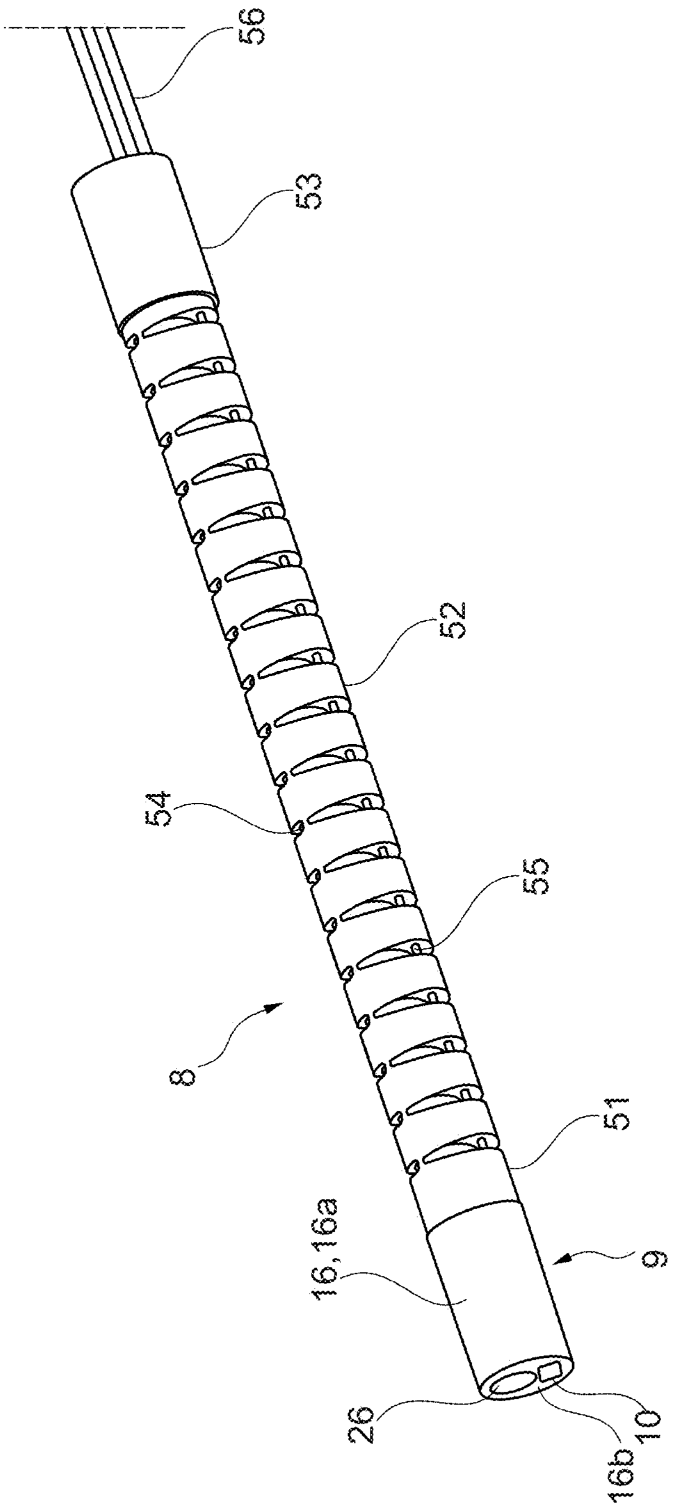
FIG. 2 shows an example of a tip housing connected to a bending section.

FIG. 2 shows that the distal tip 9 comprises a tip housing 16 which may be connected to a distal end of the bending section 8. The bending section 8 may be molded in one piece from a polymer material, such as Polyoxymethylene (POM). Typically, a bending cover (not shown) covers the bending section 8 to make this part watertight and to provide a smooth outer surface. The proximal end of the bending section 8 is attached to the insertion tube 5.

The bending section 8 in FIG. 2 is a two-way bending section, but the present technology is also relevant for an endoscope with a four-way bending section. The bending section may be molded in one piece and comprises a number of segments 52. A proximal end segment 53 is connected to the distal end of the insertion tube 5 (not shown in FIG. 2). A distal end segment 51 is connected to the proximal end of the tip housing 16. The segments are held together by hinges 54 so that the segments can reoriented relative to each other by manipulation of steering wires 55 controlled by the bending lever 7. In this example, the hinges 54 are integrally molded with the segments 52 to form a one-piece bending section 8. The steering wires are guided inside wire pipes 56, forming Bowden cables, between the proximal end of the bending section and the handle. The tip housing 16 may comprise distal working channel opening 26 and a camera 10.

FIG. 2 shows a square or rectangular camera window and a circular working channel. However, the camera window may be be circular or comprise other shapes.

Figure 3:
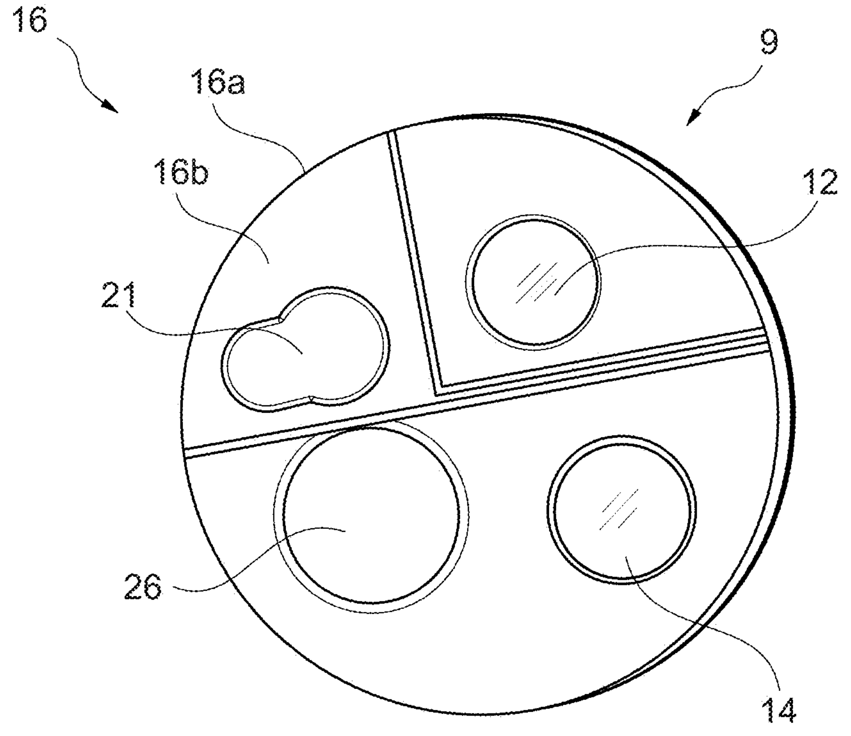
FIG. 3 shows a different example of a tip housing seen from a distal end.

FIG. 3 shows an example of a distal tip 9 of the endoscope 1 or FIG. 1 viewed from a distal end. The distal tip 9 comprises the tip housing 16 including a circumferential wall 16*a*, a distal wall 16*b*, a camera window 12, a light emitter window 14, a cleaning nozzle 21, and a distal working channel opening 26. The distal wall 16*b* may comprise the camera window 12 and the light emitter window 14, which may be molded together in one piece with the circumferential wall 16*a*. Instruments can be applied e.g., for taking tissue samples, through the distal working channel opening 26. The cleaning nozzle 21 is provided to clean the outer surface of the camera window 12 by irrigation with cleansing water.

Figure 4:
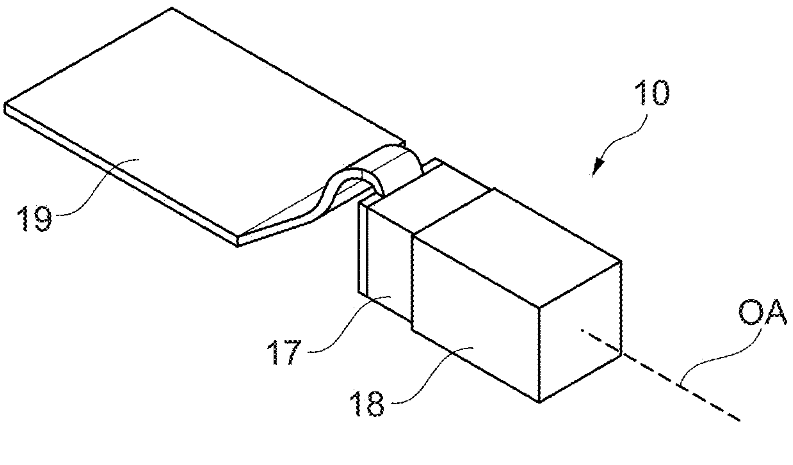
FIG. 4 shows a schematic view of a camera.

Referring now to FIG. 4, the distal tip 9 comprises a camera 10 having an image sensor 17 and a lens stack 18. The camera 10 is placed proximally and adjacent the camera window 12, and arranged to view e.g., tissue on the external side of the distal tip or any observation target which is found relevant to study during a procedure. The camera 10 has an optical axis OA which may be coincident with a center axis of the lens stack 18. The camera 10 comprises a field of view, measured as an angle, defined by the image sensor 17 and/or the lens stack 18. Images captured by the camera 10 may be shown on the monitor 41, e.g., after image processing. In an example, the field of view may be in the range of 120-140 degrees. The lens stack 18 of the camera 10 defines the optical axis OA, which may extend through a center of the image sensor 17 and a center of the imaged part of the target to be observed. The optical axis OA may extend in parallel with a longitudinal axis extending in a distal to proximal direction of the distal tip 9.

The image sensor 17 comprises one or more pixel layers configured to photoelectrically convert light into electrical signals. Because the pixels are "read" line by line, image sensors are, typically, square or rectangular in shape. A center of the image sensor 17 may be defined as the center of the one or more pixel layers. The center axis of the image sensor traverses the center and is perpendicular to a light receiving surface of the image sensor, which may be parallel to the plane or planes on which the pixels lie. Typically, the center axis is aligned longitudinally with the tip housing. Alternatively, a prism may be provided to turn the image 90 degrees, and in that case the center axis may be perpendicular to the longitudinal axis with the prism adjacent the light receiving surface of the image sensor.

As illustrated, the lens stack 18 has a square or rectangular shape. The lens stack may comprise a lens barrel holding within it individual lenses. The lens stack may be circular or comprise other shapes. A square or rectangular camera/lens stack may be provided proximally of a circular camera window. The camera window may be circular with a diameter greater than a diagonal length of the pixel layer of the image sensor, such that all the pixels are capable of receiving light.

Figure 5:
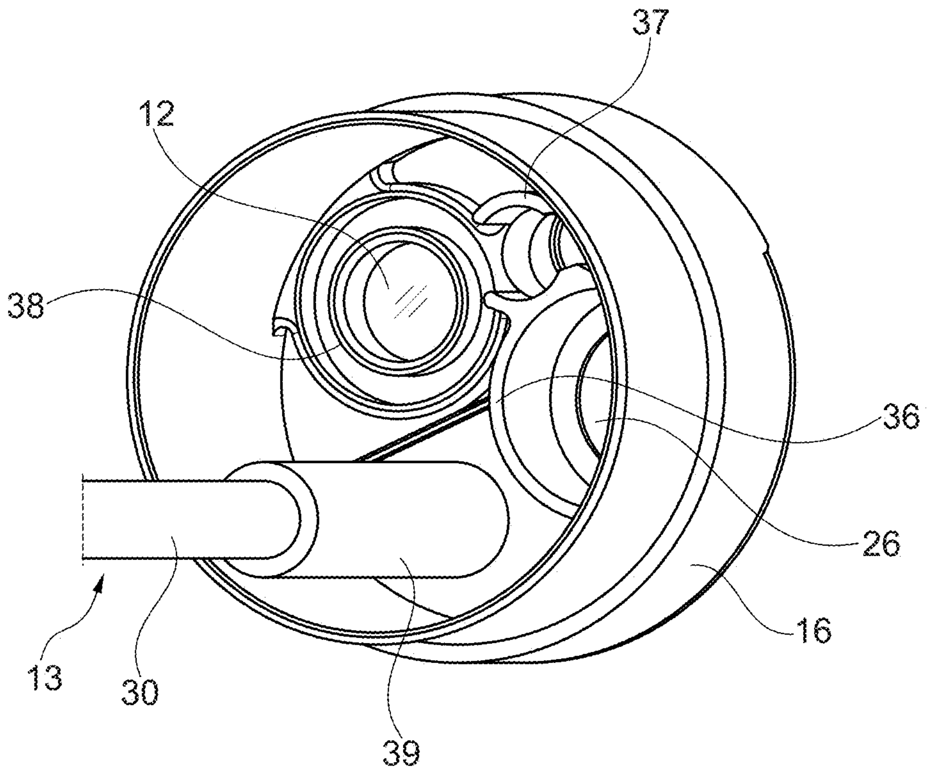
FIG. 5 shows a tip housing seen from a proximal end.

The camera 10, or part of it, may be arranged inside a tip housing 16 (which is illustrated in FIGS. 3 and 5). The camera 10 may comprise a flexible printed circuit board 19 connecting the image sensor 17 to wires (not shown) which are connected to a circuit board in the handle or to the control unit 42. A camera frame (not shown) made of a polymer material may support the flexible printed circuit board 19.

FIG. 5 shows the tip housing 16 viewed from a proximal end in a perspective view. The tip housing 16 may be molded from a polymer material, e.g., from a thermoplastic polymer, such as polycarbonate (PC) or COC, COP, PMMA. Also, silicone may be applied for the tip housing. The tip housing 16 may be molded in a two-component molding process, from a transparent material and a non-transparent material, respectively. The transparent material may preferably be applied for the camera window 12 and light emitter window 14. The non-transparent material may be applied for the rest of the tip housing 16, e.g. the circumferential wall 16*a* and portions of the distal wall 16*b*, particularly portions between the camera window 12 and light emitter window 14. By applying the two-component molding process, the transparent and non-transparent parts of the housing will be fused together in a strong and watertight connection. Alternatively, the housing parts may be separate parts which are connected, e.g., by gluing. However, gluing may complicate the manufacturing process and increase labor and material costs. Use of non-transparent material for parts of the housing, other than the windows, may reduce the risk of stray-light into the camera. For this reason, the non-transparent material may be black or dark with a surface having low reflectance.

Internal structures may be provided inside the tip housing 16. Such internal structures are seen in FIG. 5 and may be molded as part of the tip housing 16. The internal structures may comprise a support wall 36 for the working channel tubing and support walls 37 for the media tubes providing water for the cleaning nozzle 21. The support walls may comprise tubular elongate shapes. The internal structure may further comprise support structure 38 for supporting and aligning the camera 10. Such support structure 38 for the camera may be a wall encircling the distal part of the camera. Such a wall made from a non-transparent material, may support the positioning of the camera 10 and may also prevent stray-light from the light guide end 35 passing into the camera 10 and image sensor 17. Support walls 36, 37 and support structure 38 enable a simple and fast assembly of the distal tip 9 providing stable and watertight connections. Support walls 36, 37 and support structure 38 may be molded in a one-piece part with the other parts of the tip housing 16.

As illustrated in FIG. 5, an example of a light emitter 13 is arranged in the tip housing 16. The light emitter 13, here a light guide 30, may be arranged to emit light towards an observation target through the light emitter window 14 (see FIG. 3). The light emitter window 14 may be separated laterally from the camera window 12 by a non-transparent part of the distal tip to minimize risk of direct light reflections into the camera 10 via one common window in front of both the camera 10 and the light emitter 13. The light emitter 13 may be a light guide 30 guiding light from a light source placed in the handle 2, or in the control unit 42, or in the monitor 41, or as a separate unit. The light emitter could be one or more light guide 30.

The light guide 30 may be supported by a support structure 39 as illustrated in FIG. 5. This support structure may be connected to the light emitter window 14, e.g., molded as part of a two-component molding process, whereby the support structure 39 and the light emitter window may be fused together in a one-piece part, and may comprise a tubular structure with a hole sized to receive the light guide 30. The light guide 30 may be secured to an inner side of the support structure, e.g., by gluing or ultrasound welding. The distal end of the light guide may be polished before it is placed in the tip housing 16.

Figure 6:
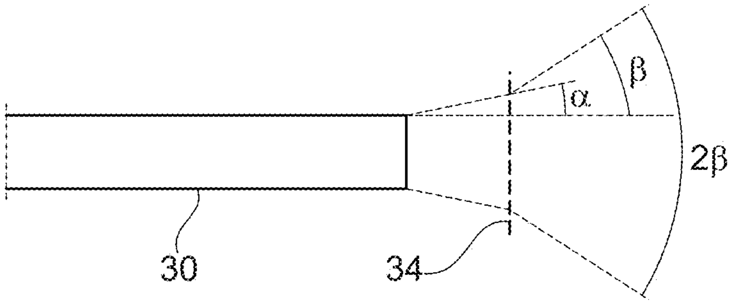
FIG. 6 shows the scattering of light exiting a light guide.

FIG. 6 shows how light will be scattered at the distal end of a light guide 30. The scattering angle $\alpha$ of the light beam emitted from the light guide may be approximately 30 degrees, which is often not enough to spread the light to the full field of view of the camera. Hence a diffractive structure 34 is positioned in front of the light guide 30 (see also FIG. 7) to improve the distribution of light from the light guide. When the light from the light guide 30 passes the diffractive structure 34, it is emitted in the angle $\beta$. Both $\alpha$ and $\beta$ are measured relative to a longitudinal, or axial, direction of the light guide. Often the field of view of an endoscope camera is above 100 degrees, e.g., in the range 110-150 degrees, or 120-140 degrees. Therefore, the diffractive structure 34 arranged distal to the light guide end, may preferably emit the light in an angle β of at least 50 degrees, or in a total angle 2β in a range 110-150 degrees, or 120-140 degrees. The total angle 2β of the cone of light may be at least equivalent to the maximum field of view angle of the camera, or slightly larger, to avoid the camera image having dark corners. Also, the light emitter window 14 and the camera window 12 are displaced as seen in FIG. 3 so the center axis of the cone of light is displaced from the optical axis OA of the camera. This further suggests that the angle 2β may be larger than the camera field of view to ensure that the cone of light fully overlaps and covers the camera field of view. In an example the light emitted distal to the light emitter window is distributed in a cone shaped light beam having an angle 2β in the range 120-160 degrees.

The light guide may be a coated fiber. The coating will protect the fiber when it is moved around during manipulation of the endoscope and bending of the bending section. The coating may also minimize the loss of light. The light guide may have an outer diameter in the range 0.25-1.5 mm.

Figure 7:
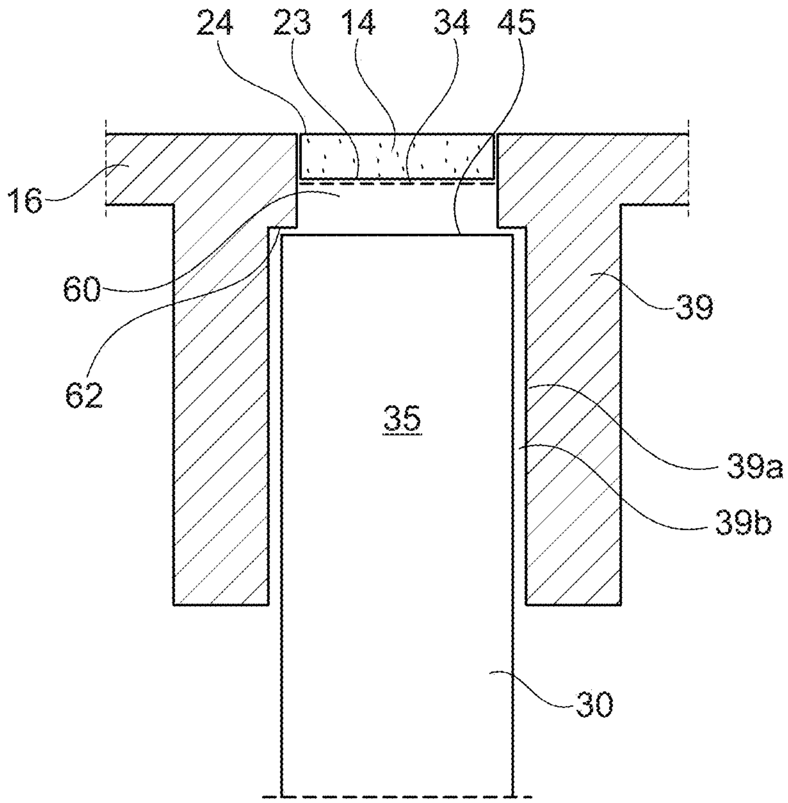
FIG. 7 shows a cross-sectional view of a part of a distal tip where a light guide is connected.

FIG. 7 shows a cross-sectional view of one example of the support structure 39 for the light guide 30, and also showing the light emitter window 14 and part of the light guide 30, and part of the tip housing 16. The light emitter window 14 has an inner surface 23 and an outer surface 24. In the example shown in FIG. 7 the diffractive structure 34 is provided at the inner surface 23 of the light emitter window 14. The diffractive structure 34 may be provided on a film layer attached to the inner surface 23 of the window 14. The diffractive layer may also be a part of the light emitter window 14, e.g., on the inner surface. The diffractive layer may be provided as part of the molding process molding the light emitter window. The diffractive structure could also be provided on a separate transparent material arranged between light exit end 35 of the light guide 30 and the light emitter window 14. As indicated in FIG. 7 the support structure may be molded in the same process as the tip housing 16 is molded. The light emitter window 14 may also be molded as part of this process, e.g., if a two-component molding process is applied. Methods of molding a tip housing are described in U.S. Pat. Nos. 9,125,582, 11,766,163 and 11,291,352, the disclosures of which are incorporated herein by reference in their entirety, and may be used to form the tip housing 16.

In an example the light exit end 35 is secured to a support structure 39 inside the tip housing 16, and the support structure has an inner bore into which the light exit end 35 is inserted. Also, the support structure 39 may be in one piece with the tip housing 16 and the support structure is extending from the distal end of the distal tip. I.e., the support structure 39 is extending from the distal surface of the tip housing 16 into an inner space of the tip housing.

Figure 8:
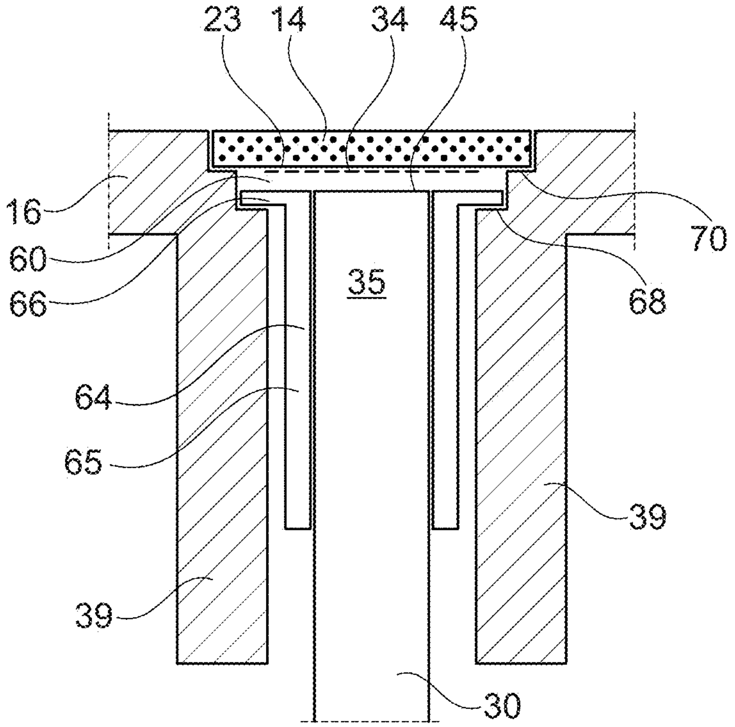
FIG. 8 shows a variation of FIG. 6 where the light guide is provided with a carrier.

FIG. 7 shows that a gap, or air gap, 60 may be present between the distal surface 45 of the light exit end 35 of the light guide 30 and the diffractive structure 34. The light guide 30 may comprise a cladding around light transmission material (e.g. fiber or fibers). Preferably, none of the distal surface 45 coextensive with the light transmission material is covered by any structure so all of the transmitted light is directed through the gap 60 to the diffractive structure 34. As seen in FIGS. 6 and 8, preferably the area of the light transmission material forming part of the distal surface 45 is parallel and smaller than the area of the diffractive structure 34 which receives the light. The diffractive structure may be in direct contact with the gap 60. This gap 60 prevents direct contact between the end of the light guide 30 and the diffractive structure 34. Such direct contact could reduce the scattering effect of the diffractive structure to some degree. The gap 60, extending between the distal surface 45 and the diffractive structure 34, may be, measured longitudinally, at least 5 micrometer, at least 15 micrometer, or at least 50 micrometer in length, and optionally not longer than 0.5 mm. Also, by providing the layer forming the diffractive structure 34 on the inner surface 23 of the light emitter window 14, it can be avoided that any layer of liquid on the exterior of the distal tip during use of the endoscope could compromise the diffusive effect of the diffractive structure 34.

A projecting rim 62 is provided to maintain the light guide 30 a gap length away from the diffractive structure 34. The projecting rim may be formed by a stepwise reduction of the dimensions of the opening in the support structure 39. The opening, which may have a circular cross-sectional shape to fit around a light guide which may also be circular will, at the position of the projecting rim 62, have a cross-sectional dimension with a reduced diameter to prevent the light guide from being inserted further in a distal direction. This projecting rim 62 is designed to prevent the light exit end 35 of the light guide 30 from abutting against the diffractive structure 34. This could reduce the effect of the diffractive structure. The light guide 30 may be glued to the inner side of the support structure 39. The projecting rim 62 can form a circular abutting surface with an opening that is slightly smaller than the maximum diameter of the light guide 30. The projecting rim 62 can also form abutting surfaces that comprises arcs of a circle rather than a complete circle, or protrusions extending inwardly, like fingers, from the inner surface 39*a* of the cavity 39*b* formed by the support structure 39. The projecting rim 62 as shown has a radially inward projecting rim surface. Alternatively, a radially inward surface could be angled e.g. cone-shaped so that the light exit end 35 is wedged in the cone without covering the cladding or any part of the the light transmission material forming part of the distal surface 45. Of course, the projecting rim 62 should be sized to block distal movement of the light exit end 35 without covering the light transmission material forming part of the distal surface 45.

FIG. 8 shows one of several possible variations of the design in FIG. 7. In FIG. 8 the light guide 30 is provided with a light guide carrier 64, which comprises a tubular portion 65, e.g. cylindrical, portion, when the light guide has a circular cross-sectional shape, secured to the distal end of the light guide 30. The light guide carrier 64 may be secured to the light guide by gluing. The carrier may have a flange 66 at its distal end extending radially outwardly from the tubular portion. The flange 66 may extend in a plane perpendicular to a longitudinal extending center axis of the light guide 30. The distal side of this flange 66 may be flush with the distal light exit end 35 of the light guide 30, and the distal side of the flange 66 and the distal surface 45 of the light guide 30 may be polished in one process, after the carrier 64 is secured to the light guide 30.

The light guide 30, including the carrier 64, may need to be inserted into the tip housing 16 and the cavity 39*b* of the support structure 39, from the distal end. After insertion, a proximal surface of the flange 66 may abut against a first edge surface 68 provided in the transition between the tip housing 16 and the support structure 39. The first edge surface 68 may be formed be a stepwise increase in diameter of the cavity 39*b* of the support structure 39, when moving in a distal direction. The flange 66 may abut the first edge surface 68 as indicated in FIG. 8. The carrier 64 may be secured to this first edge surface 68, or to an inner surface of the support structure 39, e.g., by gluing or ultrasound welding.

After the light guide 30 with the attached carrier 64 has been arranged in the support structure, a light emitter window 14 is arranged distal to the light exit end 35 of the light guide 30. This window comprises a transparent material, such as a transparent polymer plate or a transparent film. The light emitter window 14 is provided with a layer forming the diffractive structure 34. The diffractive structure may be on the inner surface 23 of the light emitter window 14. The light emitter window 14 may be supported by a second edge surface 70, and the outer surface 24 of the window may be level with the distal surface of the tip housing 16. The second edge surface 70 may be a further stepwise increase in diameter of the cavity 39*b* of the support structure 39, when moving in a distal direction. The first edge surface 68 and the second edge surface 70 are placed in the material forming a transition between the tip housing 16 and the support structure 39. The air gap 60 may be formed by selecting the distance between the first edge surface 68 and the second edge surface 70, in a longitudinal direction of the light guide 30, such that there will be some distance between the distal surface of the flange 66 and the diffractive structure 34. The diffractive structure may here be arranged on the proximal side of the light emitter window 14.

Figure 9:
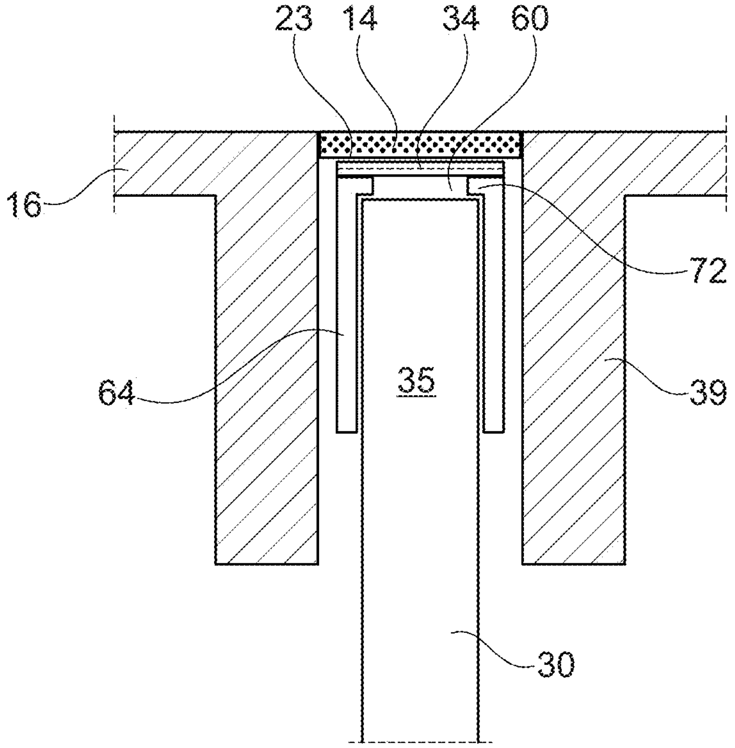
FIG. 9 shows a further variation of FIGS. 7 and 8.

FIG. 9 shows a different variation of the examples in FIGS. 7 and 8. In this variation the light guide 30 is provided with a carrier 64, which is provided with a restriction 72 at the distal end. The restriction 72 may have an inner circle with a diameter less than the inner diameter of the rest of the tubular carrier 64. This restriction 72 may abut the outer circumferential edge of the distal end surface of the light guide 30 and may also provide a support for a layer with a diffractive structure 34. The restriction 72 will in that case form the air gap 60 between the distal end of the light guide 30 and the diffractive structure 34. The layer with the diffractive structure 34 may be connected to the restriction 72, e.g., by gluing or ultrasound welding. The light guide 30 with the carrier 64 may be inserted into the cavity 39*b* of the support structure 39 from either direction. The light guide may be inserted from a proximal end of the tip housing 16. When the diffractive structure 34 is not part of the light emitter window 14, a layer with the diffractive structure 34 may be secured to the carrier, e.g., to the distal side of the restriction 72. The tubular carrier 64 should be sized to block distal movement of the light exit end 35 without covering the light transmission material forming part of the distal surface 45.

The diffractive structure may also be placed on the inner surface 23 of the light emitter window 14. If the light emitter window 14 is molded as part of the tip housing 16 in a two-component molding process, the diffractive structure 34 may be molded as part of this process. This means that the molding tool may be provided with a surface structure forming the diffractive structure on the proximal side of the window. The diffractive structure 34 could also be imprinted into the proximal side of the window 14 after the molding process, e.g., by punching.

Figure 10:
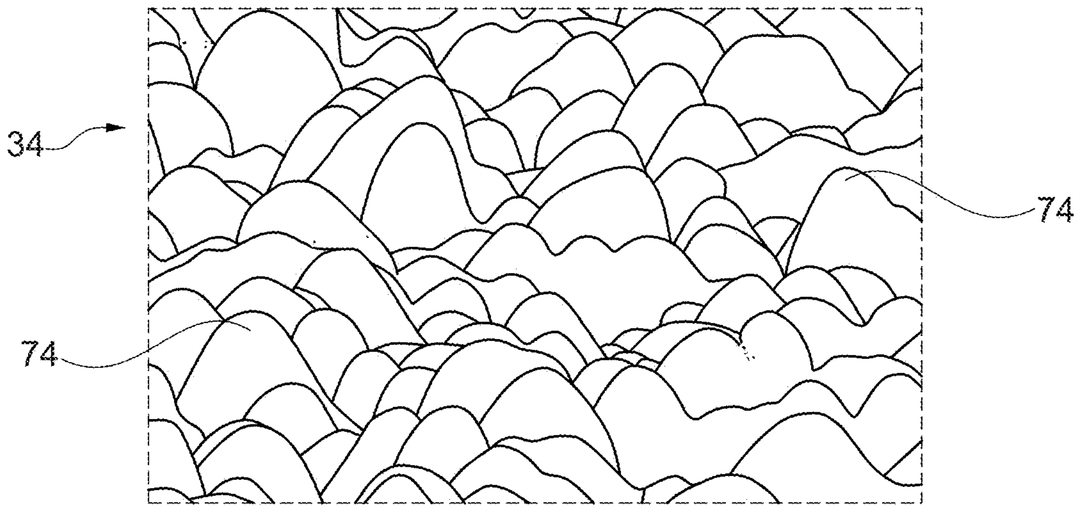
FIG. 10 shows an example of a diffractive structure.

FIG. 10 shows a micro-structure forming an example of a diffractive structure 34 in a magnified sketch. FIG. 10 shows a number of peaks 74 extending from a surface, which is not visible in the figure. Each peak 74 is a three-dimensional structure but is indicated here in two dimensions. The peaks are distributed in a random pattern to provide a uniformly distributed white light illumination. I.e., the random pattern equalizes the effect that the diffraction angle of light depends on the wavelength.

Other examples of diffractive structure may be found in the paper Murphy et al. "Holographic beam-shaping diffractive diffusers fabricated by using controlled laser speckle", Optics Express, Vol. 26, No. 7, pp. 8916 (2018), which is hereby incorporated by reference in its entirety. This layout of a diffractive structure will result in forming of a circular expanding light beam, when light emitted from a distal end of a light guide is passing. This diffractive structure, and similar structures, will scatter the light in a cone shaped light beam. The scattering angle of the light beam will depend on the dimensions of the shown structures. The variations in size and shape of the different peaks shown in FIG. 10 has the effect of providing a homogeneous light intensity distribution within the formed light beam.

When the diffractive structure 34 is provided at a surface of a transparent material, e.g., on the inner surface 23 of the light emitter window, it may be made as part of the molding process. This can be done by providing the molding tool with a surface structure matching this structure.

The diffractive structure may be a microstructure formed as a laser speckle pattern. A laser speckle pattern may be formed by guiding laser light through one or more optical components, e.g. a diffuser. The laser spackle pattern can be recorded by a holographic method. By use of a laser the laser speckle pattern may be formed on a photoresist mask, which may be placed on the molding tool or on a transparent film or window, and this may be followed by an etching process forming the diffractive structure on the surface.

A film provided with the diffractive structure may have a thickness around 0.2 mm. The dimensions of the peaks seen in the example micro-structure in FIG. 10 may be approximated by their full width at half maximum (FWHM) dimension, even though the peaks do not fully follow a Gaussian distribution, and some of them overlaps. The peaks in FIG. 10 are estimated to have FWHM in the range 5-8 micrometer, and the structure shown will scatter incoming parallel light in a total angle of 80 degrees. This corresponds to the angle $2(\beta-\alpha)$ defined by FIG. 6, where $\alpha$ is the angle of light exiting a light guide 30, and $\beta$ is the scattering angle of light having passed the diffractive structure 34.

The examples shown in FIGS. 6-9 describe a preference for a gap 60 between the light guide 30 and the diffractive structure 34. Some of the advantages described in these examples, for example assembly simplicity and small part precision achieved by use of the projecting rim 62 and the tubular carrier 64, can be achieved without the gap 60, in which case the light guide 30 may abut the diffractive structure 34, may be adhesively bonded to the diffractive structure 34, or may be positioned in a proximal recess of the diffractive structure 34.

The following items are examples of various embodiments disclosed above:

1. An endoscope comprising a handle and an insertion cord comprising a bending section, a tip housing having a camera window and a camera, the tip housing is arranged at a distal end of the bending section, a light guide extending from the handle to the tip housing, the light guide has a light entry end and a light exit end and is connected to a light source at the light entry end, the light exit end is configured to emit light toward a light emitter window, and a diffractive structure between the light exit end and a distal surface of the light emitter window, wherein the light guide passes through the insertion cord with the distal light exit end fixedly connected in the tip housing, the layer with a diffractive structure being arranged between the light exit end and an outer surface of the light emitter window.

2. The endoscope according to item 1, wherein the light exit end is secured to a support structure inside the tip housing, the support structure having an inner bore into which the light exit end is inserted.

3. The endoscope according to item 2, wherein the support structure is in one piece with the tip housing and is extending from the distal end of the distal tip.

4. The endoscope according to any one of the previous items, wherein the distal light exit end comprises a light exit surface and an air gap of at least 5 micrometer is arranged between the light exit surface and the diffractive structure.

5. The endoscope according to any one of the previous items, wherein the distal light exit end is connected to a light guide carrier supporting the distal end of the light guide, the carrier is connected to an inner space of the tip housing.

6. The endoscope according to any one of the previous items, wherein the diffractive structure is imprinted into an inner surface of the light emitter window.

7. The endoscope according to any one of the previous items, wherein the light emitter window is fused together with the tip housing and is in one piece with the tip housing.

8. The endoscope according to any one of the items 1-5, wherein the diffractive structure is on a film arranged between the light exit end and the light emitter window.

9. The endoscope according to any one of the previous items, wherein the light emitted from the diffractive structure has a scattering angle which is larger than a camera field of view angle.

10. The endoscope according to any one of the previous items, wherein the light emitted distal to the light emitter window is scattered in a cone shaped light beam.

11. The endoscope according to item 10, wherein the cone shaped light beam having a scattering angle in the range 120-160 degrees.

12. The endoscope according to item 5, wherein the carrier is provided with a distal flange abutting a first edge of the support structure.

13. A system comprising an endoscope according to any one of items 1-12, a monitor and a control unit.

14. A method for manufacturing an endoscope comprising: providing an insertion cord comprising a bending section, providing a tip housing having a camera window and a camera, the tip housing is arranged at a distal end of the bending section, providing a light guide connected to a light source in one end and having a distal light exit end in the opposite end, the light exit end configured to emit light through a light emitter window, providing a layer with a diffractive structure in a transparent material, arranging the light guide to pass through the insertion cord, connecting the distal light exit end fixedly in the tip housing, and arranging the layer with a diffractive structure between the light exit end and an outer surface of the light emitter window.

The use of the terms "first", "second", "third", "fourth", "primary", "secondary", "tertiary" etc. does not imply any particular order or importance. These labels are included to identify individual elements. Furthermore, the labelling of a first element does not imply the presence of a second element and vice versa.

As used herein, "in the range" includes the values that define the range. Therefore, "in the range of A-B" includes A and B.

The term "distal" means the direction away from the user of the endoscope and toward the patient, and the term "proximal" means to be closest to the endoscope's user. For the handle of the endoscope, the distal end is the end where the insertion tube is connected, and the proximal end is the opposite end. Furthermore, a "handle" may be a positioning interface, or interface, which functions to control the position of the insertion cord. The handle may be an interface operated by a robotic arm, or it may be an interface operated by the hand of the endoscope's user.

LIST OF REFERENCES

1 endoscope
2 handle
3 insertion cord
4 electrical cable with plug
5 insertion tube
6 working channel
7 electrical wires
10 distal tip
11 camera
12 camera window
13 light emitter
14 light emitter window
16 tip housing
17 image sensor
18 lens stack
19 flexible printed circuit board
20 bending section
21 cleaning nozzle
23 inner surface of light emitter window
24 outer surface of light emitter window
26 distal working channel opening
30 light guide
33 side wall
34 diffractive structure
35 light exit end
36 support wall for working channel tube
37 support wall for media tubes
38 support structure for camera
39 support structure for light guide
40 screen
41 monitor
42 control unit
43 visualization system
43 visualization system
45 distal surface of light guide
46 bending lever
51 distal segment
52 segment
54 hinge
55 steering wire
56 wire pipe
60 air gap
62 projecting rim
64 carrier
66 flange
68 first edge surface
70 second edge surface
72 restriction
74 peak
OA optical axis
$\alpha$ angle of light exiting light guide
$\beta$ refractive angle of diffractive structure

I claim:

1. An endoscope comprising:

a handle;

an insertion cord extending distally from the handle and comprising an insertion tube, a bending section, and a distal tip arranged at a distal end of the bending section, the distal tip comprising a tip housing including a circumferential wall, a distal wall, a support structure, a camera window and a light emitter window, the light emitter window comprising a distal surface, and the support structure comprising an inner bore;

a camera comprising a field of view angle and being accommodated in the tip housing;

a light guide extending from the handle through the insertion cord and comprising a light entry end and a light exit end distal of the light entry end, the light entry end being configured to receive light from a light source, and the light exit end being configured to emit light toward the light emitter window, the light exit end comprising a light exit surface and being positioned inside the inner bore of the support structure and-being fixedly connected to the tip housing; and a diffractive structure configured to provide a scattering angle larger than the camera field of view angle, the diffractive structure being positioned between the light exit end and the distal surface of the light emitter window with a gap between the light exit end and the light emitter window.

2. The endoscope of claim 1, wherein the gap has a length of at least 5 microns.

3. The endoscope of claim 1, wherein the light emitter window comprises the diffractive structure, and wherein the diffractive structure faces the light exit surface.

4. The endoscope of claim 3, wherein the diffractive structure is imprinted on an inner side of the light emitter window.

5. The endoscope of claim 3, wherein the light emitter window is fused together in one-piece with the tip housing.

6. The endoscope of claim 3, wherein a film comprising the diffractive structure is arranged between the light exit surface and the light emitter window.

7. The endoscope of claim 1, wherein the support structure further comprises a projecting rim defining a length of the gap, and wherein the light exit end abuts the projecting rim.

8. The endoscope of claim 1, wherein light emitted distal to the light emitter window is scattered in a cone shaped light beam.

9. The endoscope of claim 8, wherein the cone shaped light beam comprises a scattering angle in the range of 120-160 degrees.

10. The endoscope of claim 1, wherein the circumferential wall, the distal wall, and the support structure comprise a single part, and wherein the light exit end is secured to the support structure.

11. The endoscope of claim 10, wherein the support structure comprises a tubular sleeve.

12. The endoscope of claim 11, further comprising a light guide carrier comprising a distal surface and a tubular portion positioned in the tubular sleeve, wherein the light exit end is connected to the light guide carrier, and wherein the light guide carrier is connected to the tubular sleeve.

13. The endoscope of claim 12, wherein a distal surface of the light guide carrier is coplanar with the light exit surface.

14. The endoscope of claim 10, further comprising a light guide carrier, wherein the light exit end is connected to the light guide carrier, and wherein the light guide carrier is connected to the tip housing.

15. The endoscope of claim 10, further comprising a light guide carrier comprising a tubular portion and a distal flange extending radially outwardly from the tubular portion, wherein the support structure comprises a first edge surface extending radially outwardly from the inner bore, and wherein the tubular portion is located in the inner bore and the distal flange overlaps the first edge surface of the support structure.

16. The endoscope of claim 15, wherein the distal flange abuts the first edge surface.

17. The endoscope of claim 15, wherein the distal flange is adhesively bonded to the first edge surface.

18. The endoscope of claim 10, further comprising a light guide carrier comprising a tubular portion and a distal flange extending radially inwardly from the tubular portion, wherein the tubular portion is located in the inner bore, and wherein the distal flange is distal of the light exit surface, a thickness of the distal flange defining a length of the gap.

19. A system comprising the endoscope of claim 1, a monitor and a control unit.

* * * * *